United States Patent [19]

Thoreson et al.

[11] Patent Number: 5,103,609

[45] Date of Patent: Apr. 14, 1992

[54] INTUMESCABLE FIRE STOP DEVICE

[75] Inventors: Thomas L. Thoreson, Forest Lake, Minn.; Robert C. McCurdy, deceased, late of Birchwood, Minn., by Molly M. McCurdy, legal representative

[73] Assignee: Minnesota Mining & Manufacturing Company, St. Paul, Minn.

[21] Appl. No.: 614,138

[22] Filed: Nov. 15, 1990

[51] Int. Cl.⁵ .............................. F16L 5/02
[52] U.S. Cl. .............................. 52/232
[58] Field of Search .............................. 52/232, 221

[56] References Cited

U.S. PATENT DOCUMENTS

| | | | |
|---|---|---|---|
| 4,109,423 | 8/1978 | Perrain | 52/1 |
| 4,136,707 | 1/1979 | Gaillot et al. | 137/75 |
| 4,221,092 | 9/1980 | Johnson | 52/232 |
| 4,249,353 | 2/1981 | Berry | 52/232 |
| 4,364,210 | 12/1982 | Fleming et al. | 52/221 |
| 4,538,389 | 9/1985 | Heinen | 52/221 |
| 4,669,759 | 6/1987 | Harbeke | 285/158 |
| 4,804,160 | 2/1989 | Harbeke | 249/207 |
| 4,848,043 | 7/1989 | Harbeke | 52/317 |
| 4,850,385 | 7/1989 | Harbeke | 137/75 |
| 4,916,800 | 4/1990 | Harbeke | 52/232 |
| 4,951,442 | 8/1990 | Harbeke | 52/232 |

FOREIGN PATENT DOCUMENTS 2162251.5 2/1971 Fed. Rep. of Germany .

OTHER PUBLICATIONS

Minneasota Mining and Manufacturing Corp., *Fire Barrier RC-1 Restricting Collar*, 2 pages.

Primary Examiner—John E. Murtagh
Attorney, Agent, or Firm—Kinney & Lange

[57] ABSTRACT

An intumescable fire stop device that is easy to install and effectively and efficiency channels heat to an intumescent material so that the intumescent material expands quickly and uniformly includes a collar. An inner surface of the collar has a plurality of heat conducting tabs that extend outwardly and secure the intumescent material to the collar. The heat conducting tabs extend into the intumescent material and thereby effectively channel heat from a fire into the interior regions of the intumescent material so that the intumescent material expands quickly and uniformly. The collar further includes a first interlocking end having a plurality of spaced openings. The spaced openings are configured to receive spaced fingers on a second interlocking end of the collar. The interengagement of the fingers and openings allows the collar to be firmly secured about a section of a pipe. The collar has a plurality of releasibly secured Z-shaped mounting clips. The mounting clips are used to secure the collar to a firm, structural surface such as a wall or ceiling having an opening through which the pipe passes.

18 Claims, 2 Drawing Sheets

INTUMESCABLE FIRE STOP DEVICE

BACKGROUND OF THE INVENTION

The present invention relates to intumescable fire stop devices. In particular, the present invention is a fire stop device with heat conducting elements that channel heat to the interior regions of an intumescent material.

Fires typically start in one portion of a building, such as a room or office. From there, fires can spread quickly to adjoining offices or rooms and even to adjacent floors. Structural members, such as walls and ceilings slow the progression of the fires to adjoining areas since the fires must burn through these members to pass to adjacent offices and rooms. However, buildings traditionally have a large amount of plastic and insulated piping that provide needed services to the users of the building. For these pipes to pass from one room or office to the next, through holes need to be cut in walls and ceilings. Heat from fires can melt the plastic pipes as well as burn off the insulation on insulated pipes. This creates large through holes through which fires can spread from one room or office to adjacent floors and/or rooms or offices.

To slow this progression of fires, intumescable fire stop devices have been developed. Theses devices essentially comprise a collar used to secure an intumescent material about the plastic or insulated pipe at the through hole in a wall or ceiling. Heat from fires causes the plastic pipe to melt or burns off the insulation on the insulated pipe. At the same time, the heat from the fires causes the intumescent material to expand closing off the through hole left by the melted plastic pipe or left by the burned off insulation on the insulated pipe. The expanded intumescent material in the through hole in the wall or ceiling creates an insulating, fire retardant barrier that slows the spread of fires.

One such intumescable fire stop device is manufactured by the Minnesota Mining and Manufacturing Corporation of St. Paul, Minn. under the name Fire Barrier RC-1 Restricting Collar. This device is installed by first wrapping an intumescent material about a pipe and holding the intumescent material in place with tape. A sheet metal collar, must be cut to length, is then wrapped around the intumescent material and held in place with a hose clamp. Support tabs along a bottom edge of the collar are then bent inward to support the intumescent material. After mounting tabs along a top edge of the collar are bent out, the collar and intumescent material assembly is slid up the pipe to the through hole in the wall or ceiling. The assembly is secured to the wall or ceiling at the through hole by fasteners that pass through the mounting tabs and into the wall or ceiling. Any seams or edges at the interface of the assembly, the pipe and the wall or ceiling are filled with a bead of intumescent calk. Though this device is effective, it is time consuming to install.

It is evident that there is a continuing need for improved intumescable fire stop devices. Specifically, there is need for a fire stop device that is easy and less time consuming to install. In addition, there is needed a fire stop device that effectively and efficiently channels heat to the intumescent material so that the intumescent material expands quickly and uniformly.

SUMMARY OF THE INVENTION

The present invention is an intumescable fire stop device that is easy to install and effectively and efficiently channels heat to an intumescent material so that the intumescent material expands quickly and uniformly. The fire stop device includes a collar that supports the intumescent material about a section of a pipe that passes through an opening in a firm, structural surface such as a wall or ceiling. An inner surface of the collar has a plurality of heat conducting tabs that extend outwardly and secure the intumescent material to the collar. The heat conducting tabs extend into the intumescent material and thereby effectively channel heat from a fire into the interior regions of the intumescent material so that the intumescent material expands quickly and uniformly.

The intumescent material includes a layer of fire barrier moldable putty along a top edge, a first end edge, a second end edge and along a portion of an inside surface of the intumescent material. The moldable putty is formed from intumescent and heat absorbing materials.

The collar further includes a first interlocking end having a plurality of spaced openings. The spaced openings are configured to receive spaced fingers on a second interlocking end of the collar. Once the spaced fingers pass through the spaced openings, the fingers are bent back upon themselves to interlock the first and second interlocking ends and thereby firmly secure the collar about the section of the pipe.

The collar further includes a plurality of mounting projections. The plurality of mounting projections are configured to secure a plurality of substantially Z-shaped mounting clips to the collar. Each mounting clip includes a connecting plate, a top plate extending from a first end of the connecting plate, and a bottom plate extending from a second end of the connecting plate. The connecting plates include mounting apertures that are configured to receive the mounting projections which serve to secure the mounting clips to the collar.

The top plates of the mounting clips include through holes. The through holes are adapted to receive threaded fasteners which fasten the mounting clips and thereby the collar to the structural surface adjacent the opening therein. The bottom plates of the mounting clips extend beneath a bottom edge of the collar to provide support to the collar in addition to the support provided by interengagement of the mounting projections and the mounting apertures of the mounting clips.

This intumescable fire stop device is relatively uncomplicated. The intumescable fire stop device is less time consuming and easier to install than prior art devices due to the interlocking first and second ends of the collar and the pre-application of the intumescent material and moldable putty at the manufacturing facility. These features allow the intumescable fire stop device to be easily retrofit to existing building structures and installed in new constructions. In addition, the heat conducting tabs provide excellent heat distribution. The heat conducting tabs act to channel heat from a fire to the interior regions of the intumescent material causing the intumescent material to expand quickly and uniformly to seal off the opening in the structural surface.

DETAILED DESCRIPTION OF THE PREFERRED EMBODIMENTS

Figure 1:
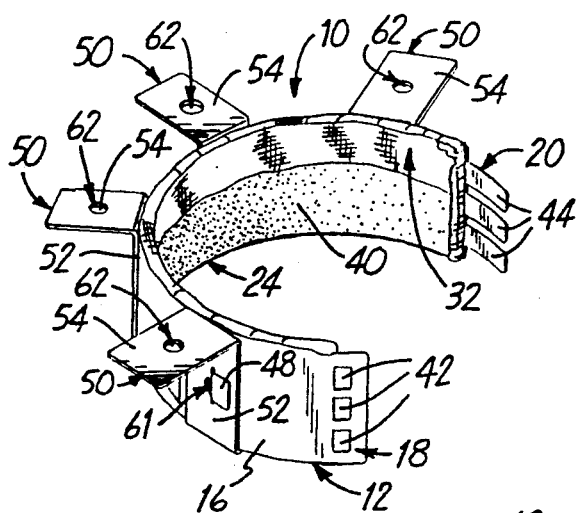
FIG. 1 is a perspective view of an intumescable fire stop device in accordance with the present invention.
Figure 2:
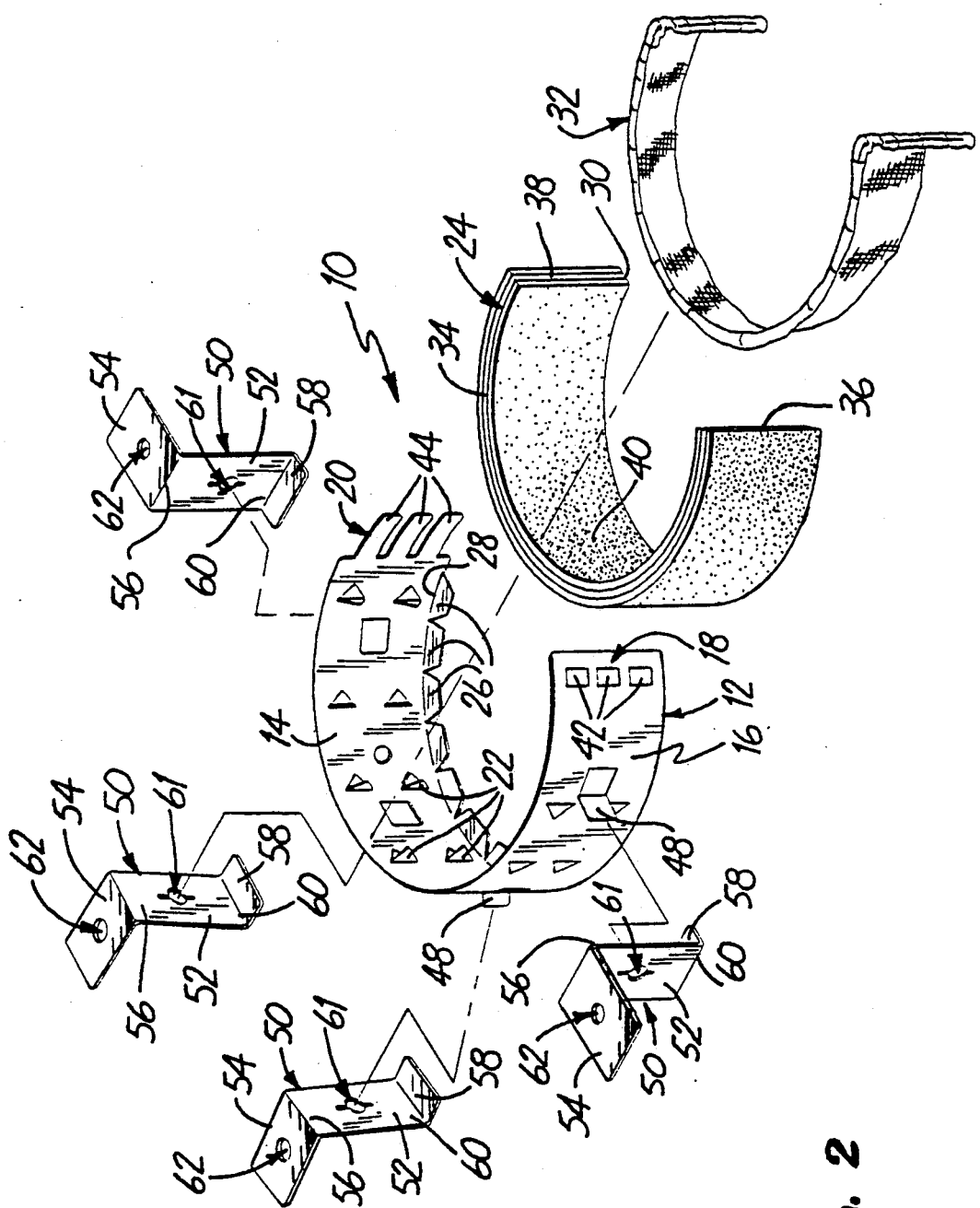
FIG. 2 is an exploded perspective view of the intumescable fire stop device shown in FIG. 1.

An intumescable fire stop device 10 in accordance with the present invention is illustrated generally in FIGS. 1 and 2. As seen best in FIG. 2, the fire stop device 10 includes a collar 12 defined by an inner surface 14, an outer surface 16, a first interlocking end 18 and a second interlocking end 20. The collar 12 is formed of any suitable, somewhat flexible, heat conducting material, such as steel.

The collar 12 includes a plurality of triangular-shaped heat conducting tabs 22 that extend outwardly from the inner surface 14 of the collar 12. As seen in FIG. 2, the heat conducting tabs 22 are arranged in rows about the inner surface 14 such that the heat conducting tabs 22 are equally spaced about the collar 12. The heat conducting tabs 22 are integral with the collar 12 and are simply stamped out of the collar 12 and then bent upwardly such that each of the heat conducting tabs 22 forms a generally 90 degree angle relative to the inner surface 14.

The heat conducting tabs 22 are configured to extend into the interior of an intumescent material 24 so as to support the intumescent material 24 against the inner surface 14 of the collar 12. The intumescent material 24 is manufactured by the Minnesota Mining and Manufacturing Corporation of St. Paul, Minn. under the name Fire Barrier FS-195 Wrap/Strip. The collar 12 further includes a plurality of support ledges 26 that extend outwardly from the inner surface 14 at a bottom edge 28 of the collar 12. The support ledges 26 are configured to engage a bottom edge 30 of the intumescent material 24, and thereby help support the intumescent material 24 along the inner surface 14 of the collar 12. The support ledges 26 are integral with the collar 12 and are simply stamped out of the collar 12 and then bent upwardly such that each of the support ledges 26 forms a generally 90 degree angle relative to the inner surface 14.

As seen in FIGS. 1 and 2, the intumescent material 24 includes a layer (i.e., flat strip) of moldable putty 32 along a top edge 34, a first end edge 36, a second end edge 38 and along a portion of an inside surface 40 of the intumescent material 24. The moldable putty 32 is formed from intumescent and heat absorbing materials and is manufactured by the Minnesota Mining and Manufacturing Corporation of St. Paul, Minn. under the name Fire Barrier MPP-1.

Figure 3:
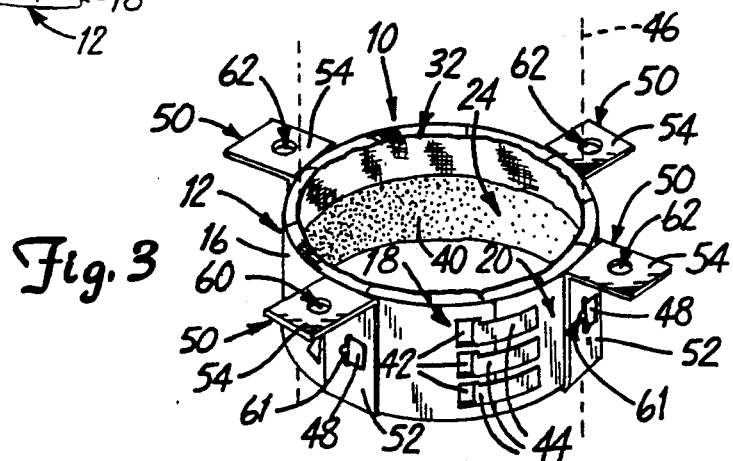
FIG. 3 is a perspective view of the intumescable fire stop device of the present invention shown secured about a pipe indicated by dashed lines.

As seen in FIGS. 1 and 2, the first interlocking end 18 of the collar 12 includes a plurality of spaced slots 42. The second interlocking end 20 of the collar 12 includes a plurality of spaced fingers 44 that are integral with the collar 12. As seen in FIG. 3, the spaced fingers 44 cooperate with the spaced slots 44 to interlock the first and second interlocking ends 18 and 20 and thereby secure the collar 12 about a section of a pipe 46 (shown in dashed lines in FIG. 3). The pipe 46 can be a plastic-type pipe or an insulated pipe. The spaced fingers 44 are configured to be extended through corresponding spaced slots 42 and then be bent back upon themselves to firmly secure the collar 12 about the pipe 46. Though three spaced fingers 44 and three spaced slots 42 are shown in FIGS. 1-3, it is to be understood that any number of corresponding fingers and slots could be used as long as the collar 12 firmly secured about the pipe 46.

The collar 12 further includes a plurality of rectangular, mounting projections 48 that extend outwardly from the outer surface 16 of the collar 12. As seen best in FIG. 2, the mounting projections 48 are integral with and equally spaced about the outer surface 16. The mounting projections 48 are stamped out of the collar 12 and then bent upwardly such that each mounting projection 48 forms a generally 90 degree angle with the outer surface 16. The plurality of mounting projections 48 are configured to secure a plurality of substantially Z-shaped mounting clips 50 to the collar 12.

As seen best in FIG. 2, each mounting clip 50 includes a connecting plate 52, a top plate 54 extending from a first end 56 of the connecting plate 52 and a bottom plate 58 extending from a second end 60 of the connecting plate 52. The top plate 54 and the bottom plate 58 extend generally perpendicular to the connecting plate 52. In addition, the top plate 54 extends in a first direction from the connecting plate 52 while the bottom plate 58 extends in a second, opposite direction from the connecting plate 52.

The connecting plate 52 of each mounting clip 50 includes a mounting aperture 61 (see FIG. 2). The mounting projections 48 are configured to engage the mounting apertures 61 in the connecting plates 52 to thereby secure the mounting clips 50 to the collar 12. As seen in FIGS. 1 and 3, each mounting projection 48 extends through the mounting aperture 61 of a corresponding mounting clip 50 and is bent over to hold the connecting plate 52 and firmly couple the mounting clip 50 to the collar 12. To remove one of the mounting clips 50 from the collar 12, the corresponding mounting projection 48 need only be straightened to allow the mounting projection 48 to pass out of the mounting aperture 61 and thereby permit the mounting clip 50 to be disengaged from the collar 12. As seen in FIG. 3, the mounting clips 50 are equally spaced about the collar 12.

Figure 4:
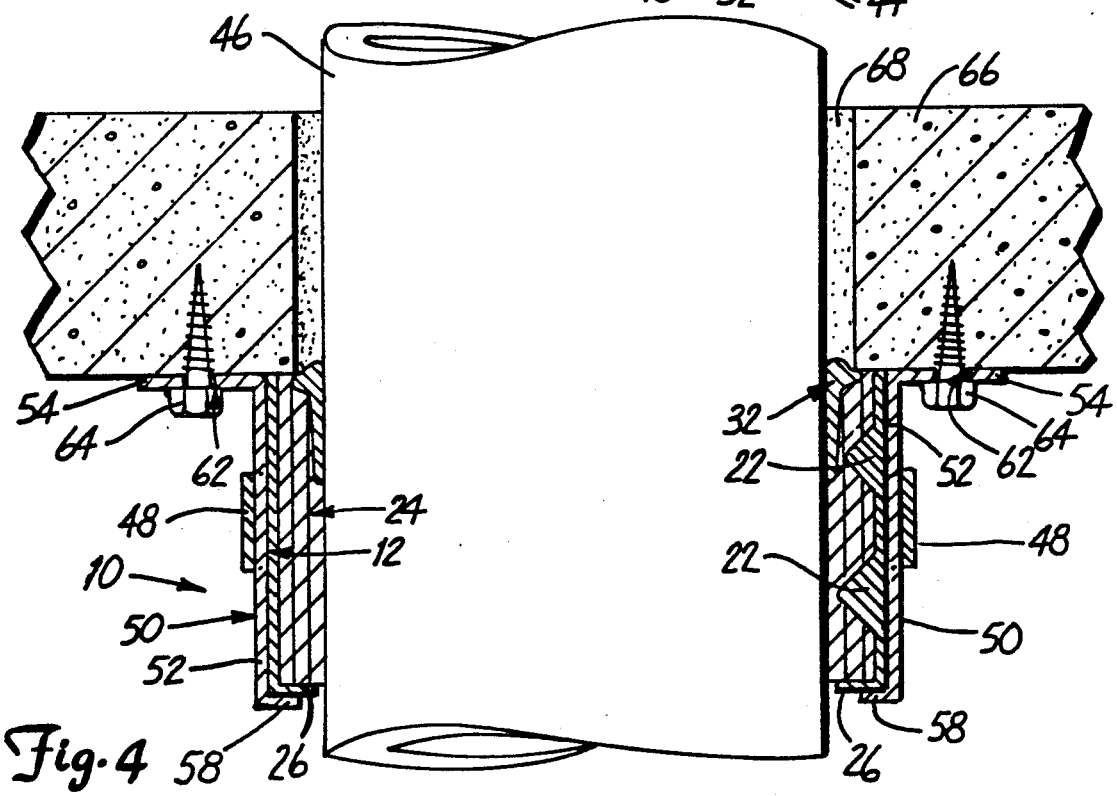
FIG. 4 is a sectional view of the intumescable fire stop device of the present invention shown secured about a pipe extending through an opening in a firm surface, with the pipe shown in full.

Each of the top plates 54 of the mounting clips 50 includes a through hole 62. As seen in FIG. 4, the through holes 62 of the mounting clips 50 are adapted to receive threaded fasteners 64. The threaded fasteners 64 are used to fasten the mounting clips 50 and thereby the collar 12 to a firm, structural surface 66 (i.e., a wall or ceiling) having an opening 68 through which the pipe 46 passes. As seen in FIG. 4, the bottom plates 58 extend beneath the support ledges 26 to provide support to the collar 12 in addition to the support provided by interengagement of the mounting projections 48 with the mounting apertures 61 of the mounting clips 50.

Installation of intumescable fire stop device 10 is relatively simple. The fire stop device 10 comes preassembled as shown in FIG. The intumescent material 24 is secured to the collar 12 by way of the heat conducting tabs 22, the moldable putty 32 is preapplied to the intumescent material 24 and the mounting clips 50 are secured to the collar 12 via the interengagement of the mounting projections 48 with the mounting apertures 61. Since the collar 12 is sufficiently flexible, an installer need only spread the first and second interlocking ends 18 and 20 apart creating a gap through which the pipe 46 can pass as the collar 12 is placed about the pipe 46 adjacent to the structural surface 66 at the opening 68.

Next, the spaced fingers 44 are extended through corresponding slots 42 and then bent back upon themselves to interlock the first and second interlocking ends 18 and 20, and thereby firmly secure the collar 12 about the pipe 46 (see FIG. 3). The threaded fasteners 64 are then inserted through the through holes 62 in the top plates 54 to fasten the mounting clips 50 and thereby the collar 12 to the structural surface 66 at the opening 68 (see FIG. 4). Installation of the intumescable fire stop device 10 in accordance with the present invention is then complete.

As seen in FIG. 4, the moldable putty 32 along the top edge 34 and the portion of the inside surface 40 of the intumescent material 24 forms a seal between the pipe 46 and the structural surface 66 and thereby seals the opening 68. The moldable putty 32 along the first end edge 36 and the second end edge 38 of the intumescent material 24 forms a seal between the first and second end edges 36 and 38 at the interlock of the first and second interlocking ends 18 and 20 of the collar 12. Three layers of intumescent material 24 are shown in FIGS. 3 and 4, however, there can be any number of layers of intumescent material depending upon the size of the pipe 46 and the amount of intumescent material needed to close off the opening 68 in the structural surface 66.

Heat from a fire destroys the pipe 46 and causes the intumescent material 24 to expand and seal the opening 68 in the structural surface 66 with an insulating, fire retardant barrier. The intumescent material 24 expands quickly and uniformly because the heat conducting tabs 22 effectively and efficiently channel heat to the interior regions of the intumescent material 24.

The intumescable fire stop device 10 can be retrofit to existing building structures and installed in new constructions. In addition, the intumescable fire stop device 10 is less time consuming and easier to install than prior art devices due to the interlocking first and second ends 18 and 20 of the collar 12 and the pre-application of the intumescent material 24 and moldable putty 32.

Although the present invention has been described with reference to preferred embodiments, workers skilled in the art will recognize that changes may be made in form and detail without departing from the spirit and scope of the invention.

What is claimed is:

1. An intumescable fire stop device which has a collar that supports an intumescent material about a section of a pipe, such that when the intumescent material becomes sufficiently heated it expands to close off the section of the pipe and create a fire stop barrier along the pipe, the improvement which comprises:
   a plurality of heat conducting tabs arranged about the collar, the tabs projecting toward the pipe and into the intumescent material, for channeling heat into the interior of the intumescent material so that the intumescent material expands quickly and uniformly, the collar including first and second interlocking ends such that the first interlocking end cooperates with the second interlocking end to secure the collar about the section of the pipe, the collar being sufficiently flexible to allow the first and second interlocking ends to be spread apart for installation of the collar about the section of the pipe.

2. The fire stop device of claim 1 wherein the first interlocking end has at least one slot and the second interlocking end has at least one finger which is configured to engage the at least one slot to thereby secure the collar about the section of the pipe.

3. The fire stop device of claim 1 wherein the collar further includes:
   a plurality of mounting clips for securing the collar to a firm surface such as a wall or ceiling having an opening through which the pipe passes.

4. The fire stop device of claim 3 wherein each of the plurality of mounting clips includes:
   a connecting plate through which the mounting clip is coupled to the collar; and
   a top plate extending from the connecting plate at a first end thereof, wherein the top plate is configured to cooperate with the firm surface to thereby secure the collar to the firm surface about the section of the pipe.

5. The fire stop device of claim 4 wherein each of the plurality of mounting clips further includes:
   a bottom plate extending from the connecting plate at a second end thereof, wherein the bottom plate is configured to engage a bottom edge of the collar to help support the collar when the collar is secured about the section of the pipe.

6. The fire stop device of claim 5 wherein the top plate extends in a first direction from the connecting plate and the bottom plate extends from the connecting plate in a second direction opposite to the first direction.

7. The fire stop device of claim 3 wherein the plurality of mounting clips are substantially equally spaced about the collar.

8. The fire stop device of claim 4 wherein the connecting plate has a mounting aperture, and the collar includes a plurality of mounting projections that are configured to releasibly engage the mounting apertures of corresponding mounting clips to secure the mounting clips to the collar.

9. The fire stop device of claim 1, and further including:
   a flat strip of moldable putty along a portion of an inner surface of the intumescent material, and along a top edge of the intumescent material, the moldable putty forming a seal between the pipe and a firm surface, such as a wall or ceiling having an opening through which the pipe passes, when the collar is secured about the section of the pipe.

10. The fire stop device of claim 9 wherein the flat strip of moldable putty further extends along first and second end edges of the intumescent material and forms a seal between the first and second end edges of intumescent material when the collar is secured about the section of pipe.

11. The fire stop device of claim 8 wherein the tabs and the mounting projections are integrally formed with the collar.

12. The fire stop device of claim 1 wherein the plurality of tabs are generally equally spaced about the collar.

13. In an intumescable fire stop device which has a collar that supports an intumescent material about a section of a pipe, such that when the intumescent material becomes sufficiently heated it expands to close off the section of the pipe and create a fire stop barrier along the pipe, the improvement which comprises:
   first and second interlocking ends on the collar, the first interlocking end having a plurality of spaced slots and the second interlocking end including a plurality of spaced fingers that are configured to extend through the slots and be bent back upon themselves to interlock the first and second interlocking ends and thereby secure the collar about the section of the pipe.

14. The fire stop device of claim 13 wherein the collar includes:
a plurality of heat conducting tabs arranged about the collar, the tabs projecting into the intumescent material, for securing the intumescent material to the collar and for channeling heat into the interior of the intumescent material so that the intumescent material expands quickly and uniformly.

15. The fire stop device of claim 13, and further including:
a plurality of substantially Z-shaped mounting clips releasibly secured to the collar for securing the collar to a firm surface such as a wall or ceiling having an opening through which the pipe passes.

16. In an intumescable fire stop device which has a collar that supports an intumescent material about a section of a pipe, such that when the intumescent material becomes sufficiently heated it expands to close off the section of the pipe and create a fire stop barrier along the pipe, the improvement which comprises:
a plurality of mounting clips for securing the collar to a firm surface such as a wall or ceiling having an opening through which the pipe passes, each of the plurality of mounting clips including:
a connecting plate through which the mounting clip is readily, releasably coupled to the collar; and
a top plate extending from the connecting plate at a first end thereof, wherein the top plate is configured to cooperate with the first surface to thereby secure the collar to the firm surface about the section of the pipe.

17. The fire stop device of claim 16 wherein each of the plurality of mounting clips further includes:
a bottom plate extending from the connecting plate at a second end thereof, wherein the bottom plate is configured to engage a bottom edge of the collar to help support the collar when the collar is secured about the section of the pipe.

18. The fire stop device of claim 16 wherein the connecting plate has a mounting aperture, and the collar includes a plurality of mounting projections that are configured to releasibly engage the mounting apertures of corresponding mounting clips to secure the mounting clips to the collar.

* * * * *